(12) United States Patent
Bolin et al.

(10) Patent No.: US 8,839,642 B2
(45) Date of Patent: Sep. 23, 2014

(54) THERMAL SOLAR ENERGY COLLECTOR FOR PRODUCING HEAT AND/OR COOLING

(75) Inventors: Goran Bolin, Taby (SE); Ray Olsson, Aland (FI)

(73) Assignee: Climatewell AB, Hagersten (SE)

( * ) Notice: Subject to any disclaimer, the term of this patent is extended or adjusted under 35 U.S.C. 154(b) by 1118 days.

(21) Appl. No.: 12/672,430

(22) PCT Filed: Nov. 28, 2008

(86) PCT No.: PCT/SE2008/000675
§ 371 (c)(1),
(2), (4) Date: May 3, 2010

(87) PCT Pub. No.: WO2009/070090
PCT Pub. Date: Jun. 4, 2009

(65) Prior Publication Data
US 2011/0056234 A1 Mar. 10, 2011

(30) Foreign Application Priority Data

Nov. 29, 2007 (SE) .................................... 0702648

(51) Int. Cl.
*F25B 15/00* (2006.01)
*F25B 27/00* (2006.01)
*F25D 3/08* (2006.01)
*F25B 30/06* (2006.01)
*F28D 20/00* (2006.01)
*F24J 2/42* (2006.01)

(52) U.S. Cl.
CPC .............. *F28D 20/003* (2013.01); *F25B 30/06* (2013.01); *Y02E 60/142* (2013.01); *Y02E 70/30* (2013.01); *F25B 27/007* (2013.01); *F24J 2/42* (2013.01); *Y02E 10/40* (2013.01)
USPC ............. 62/476; 62/101; 62/235.1; 62/238.3; 62/530

(58) Field of Classification Search
USPC ...................... 62/101, 235.1, 238.3, 476, 530
See application file for complete search history.

(56) References Cited

U.S. PATENT DOCUMENTS 4,135,371 A * 1/1979 Kesselring et al. ............. 62/477
4,231,722 A 11/1980 Berg
(Continued)

FOREIGN PATENT DOCUMENTS

SU 1477999 * 5/1989
WO 9908052 2/1999

OTHER PUBLICATIONS

International Search Report and Written Opinion for PCT/SE08/00675 mailed Feb. 26, 2009.

*Primary Examiner* — Alexandra Elve
*Assistant Examiner* — Henry Crenshaw
(74) *Attorney, Agent, or Firm* — Perkins Coie LLP

(57) ABSTRACT

A chemical heat pump includes a reactor part (1) that contains an active substance and an evaporator/condenser part (3) that contains that portion of volatile liquid that exists in a condensed state and can be absorbed by the active substance. A channel (4) interconnects the reactor part and the evaporator/condenser part. To heat the reactor part, a portion of this wall is arranged as a solar energy collector, which can result in a very compact structure. In at least the reactor part a matrix (13) is provided for the active substance so that the active substance both in its solid state and its liquid state or its solution phase is held or carried by or bonded to the matrix. The matrix is advantageously an inert material such as aluminium oxide and has pores, which are permeable for the volatile liquid and in which the active substance is located. In particular, a material can be used that has a surface or surfaces, at which the active substance can be bonded in its liquid state thereof. For example, the matrix can be a material comprising separate particles such as a powder or a compressed fibre material.

33 Claims, 10 Drawing Sheets

(56) References Cited

U.S. PATENT DOCUMENTS

| | | | |
|---|---|---|---|
| 4,231,772 A * | 11/1980 | Berg | 62/235.1 |
| 4,660,629 A * | 4/1987 | Maier-Laxhuber et al. | 165/104.12 |
| 5,048,301 A * | 9/1991 | Sabin et al. | 62/101 |
| 5,440,899 A * | 8/1995 | De Beijer et al. | 62/480 |
| 5,897,845 A * | 4/1999 | Denny et al. | 423/210 |
| 6,082,353 A * | 7/2000 | van Doorn | 126/659 |
| 6,378,326 B2 * | 4/2002 | Maier-Laxhuber et al. | 62/480 |
| 6,634,183 B1 * | 10/2003 | Jonsson et al. | 62/476 |
| 2002/0017380 A1 * | 2/2002 | Jonsson et al. | 165/104.12 |
| 2002/0166335 A1 * | 11/2002 | Smith et al. | 62/480 |
| 2003/0041608 A1 * | 3/2003 | Gonzalez-Cruz et al. | 62/235.1 |

* cited by examiner

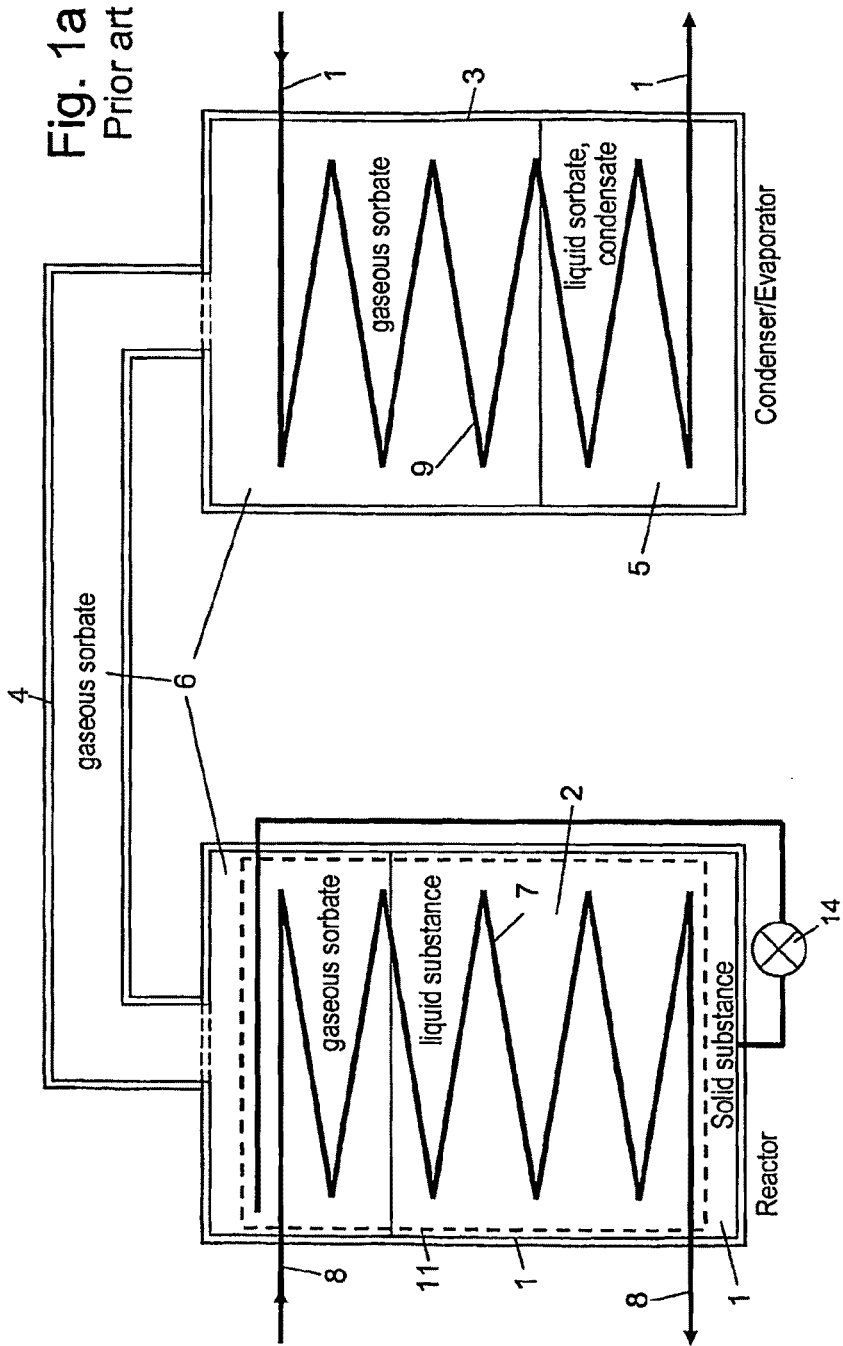

Charging

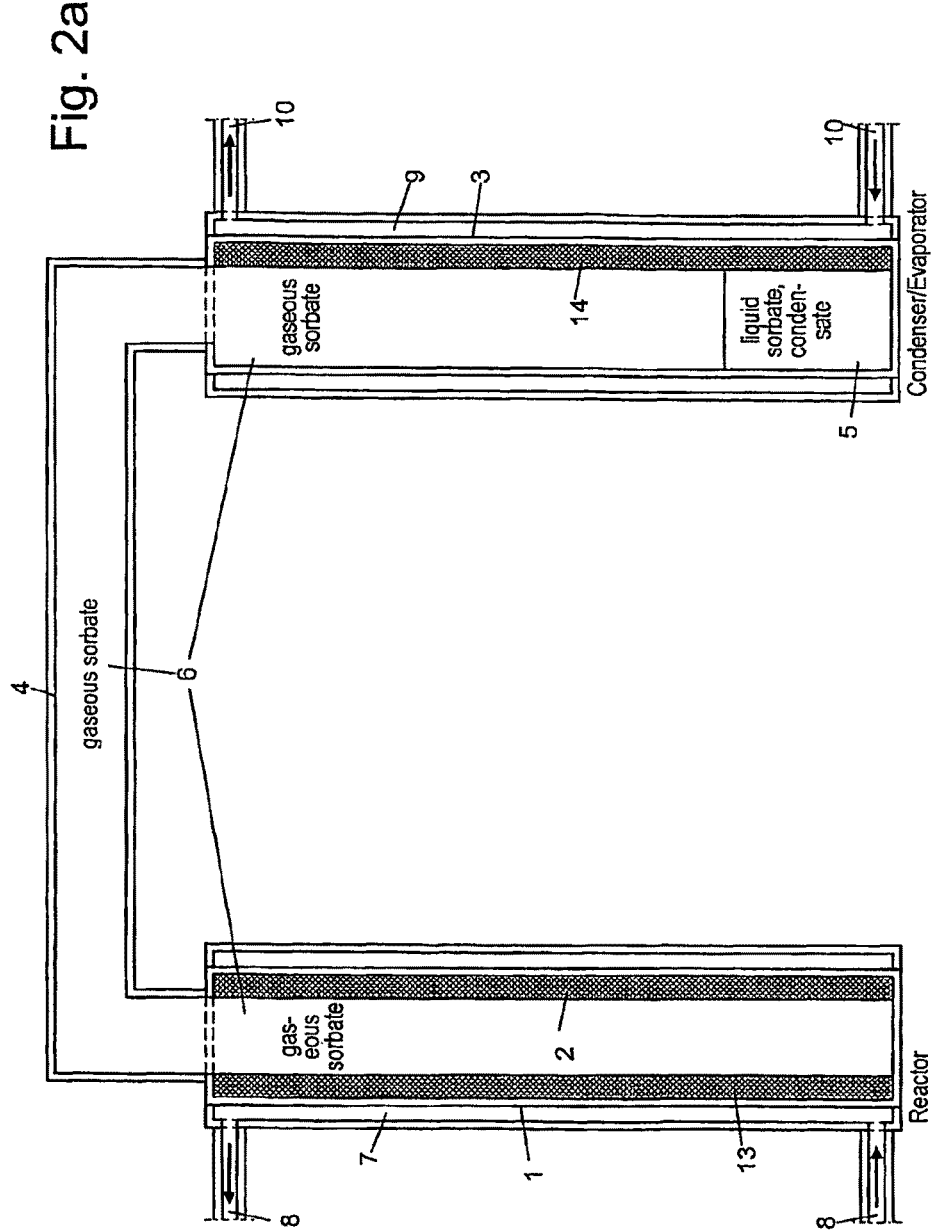

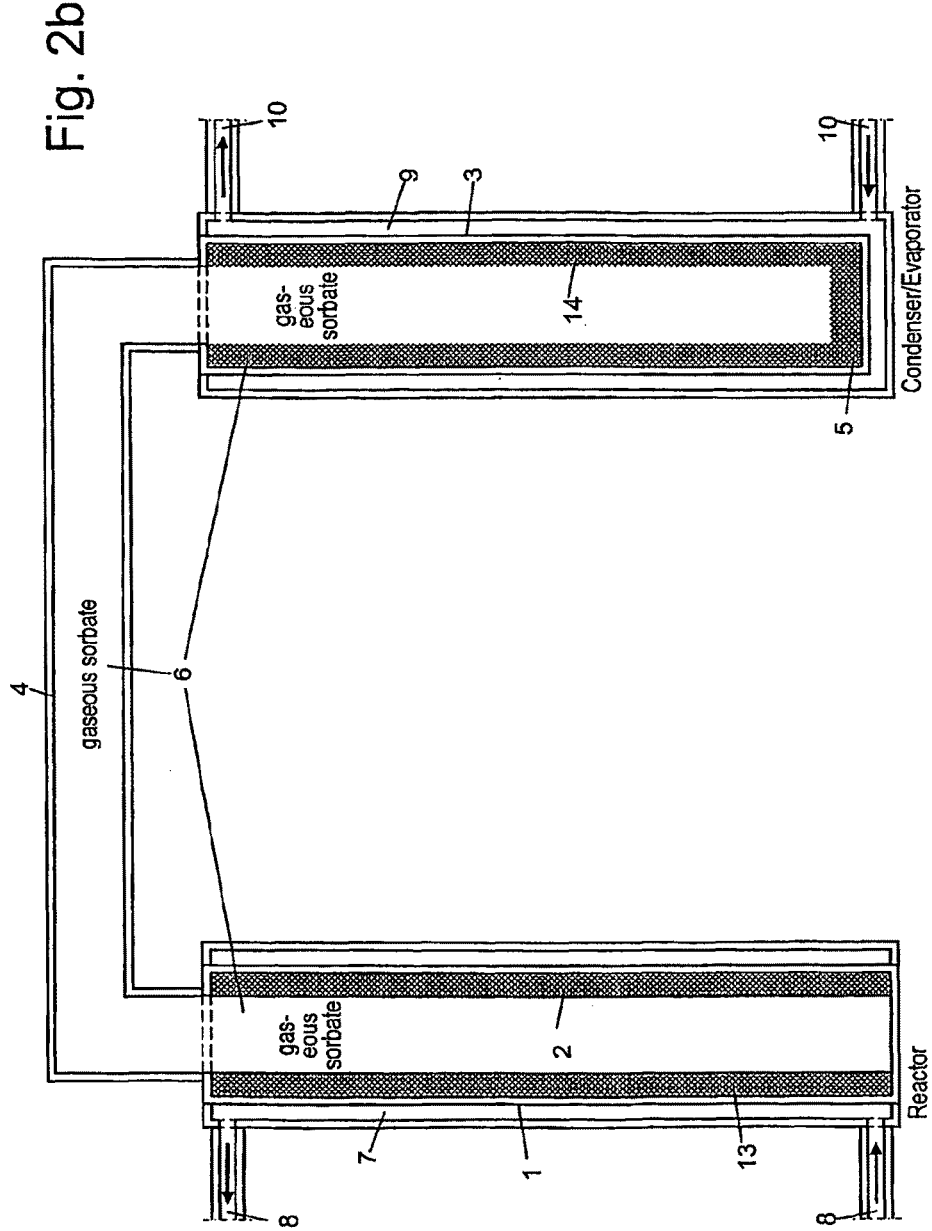

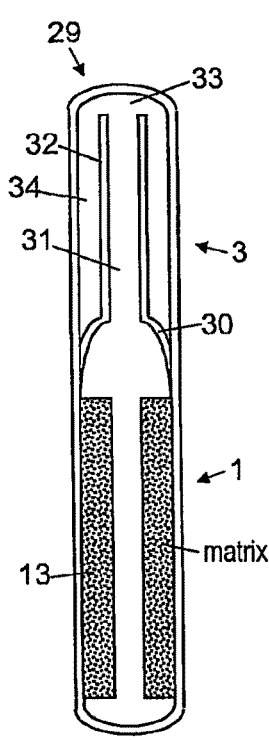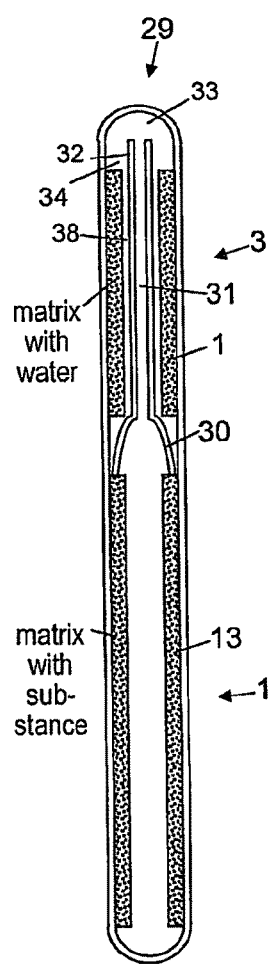

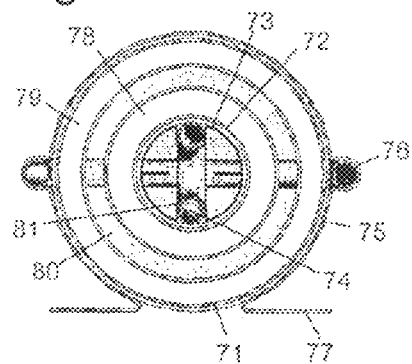
Fig. 9a
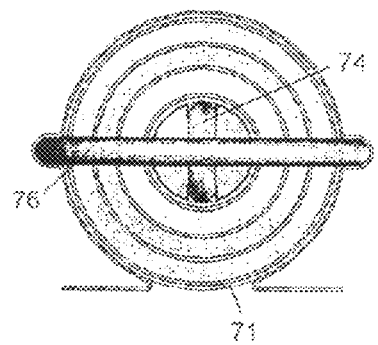
Fig. 9b
Fig. 9c
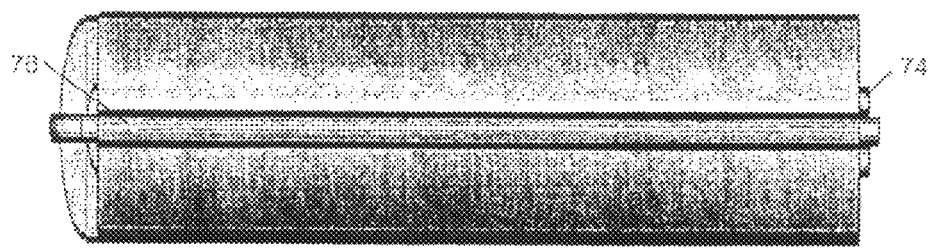
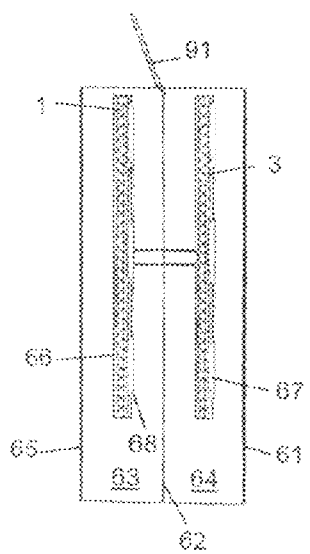
Fig. 10a
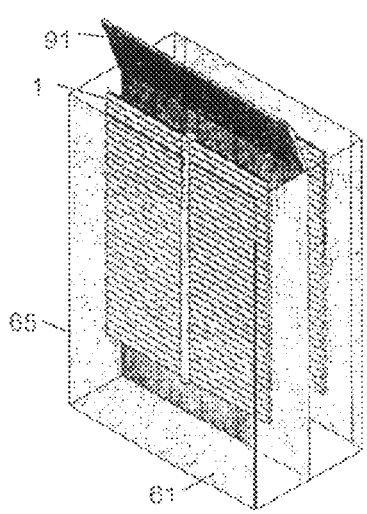
Fig. 10b

THERMAL SOLAR ENERGY COLLECTOR FOR PRODUCING HEAT AND/OR COOLING

RELATED APPLICATIONS

This application claims priority and benefit from Swedish patent application No. 0702648-7, filed Nov. 29, 2007, the entire teachings of which are incorporated herein by reference. Also, the present application has some material in common with the published International patent application No. WO 2007/139476.

TECHNICAL FIELD

The present invention relates to a thermal solar energy collector for producing heating and/or cooling.

BACKGROUND OF THE INVENTION

The economic and technical challenges are generally known, which exist in collecting the freely accessible solar energy. Technically such a solution has to manage big and swift variations of temperature, varying air humidity and mechanical stress. The device, i.e. the solar energy collector, should also in an economically justifiable way move the solar energy from a relatively large area to a point, where it can be used.

Solar cooling has increasingly begun to be used as an efficient way of eliminating $CO_2$-emissions caused by conventional cooling plants. However, a disadvantage associated with solar cooling systems is that they often are substantially more expensive than common cooling plants. In a solar cooling system, for example chemical heat pumps can be used.

The principle of the function of the chemical heat pump is well known, see for example U.S. Pat. Nos. 5,440,889, 5,056,591, 4,993,239, 4,754,805 and the published International patent applications WO 94/21973, WO 00/31206, WO 00/37864 and WO 2005/054757. In a chemical heat pump an active substance is provided that performs the very process of the heat pump and that works together with a volatile medium, the absorbent, which usually is a dipolar liquid, in most cases water. As the working active substance can, according to the prior art, either a solid substance, a liquid substance or a "hybrid substance" be used. By "solid" active substance is meant that the substance all the time, during the whole process and all cycles remains in a solid state, i.e. both with and without a volatile medium absorbed therein. By a "liquid" active substance is meant that the substance all the time, during the whole process and all cycles, remains in a liquid state, i.e. both with and without a volatile medium absorbed therein. By a "hybrid" substance is meant that the active substance during the process in the heat pump is alternating between a solid state and a liquid state.

For a solid active substance, advantages are obtained that include that the cooling temperature in the system in which the heat pump is incorporated remains constant during the whole discharging process and that a relatively large storage capacity can be obtained. A typical value of the storing capacity for a solid substance using water as the absorbent, taken as cooling energy, is about 0.3 kWh/l substance. Another advantage associated with the use of a solid substance is that no moving components are required in the system. Heat is supplied to or drawn from the substance through a lamellar heat exchanger or a plate heat exchanger that is in a homogeneous contact with the substance. Hence, in the chemical heat pump described in the cited patent application WO 00/31206 no moving components are provided on the process side. The disadvantage associated with a solid substance is the limited power that can be obtained due to the generally low heat conductivity of solid substances. In the same patent application, among other things, a method is described for solving the problem associated with the bad heat conductivity of solid substances and the low power/efficiency resulting therefrom. The method includes that the solid substance is silted up in the sorbate to form a slurry having such a consistency that it can be easily filled around or into a heat exchanger. The amount of sorbate in the slurry should exceed the concentration of sorbate that will later exist in the discharged state of the heat pump. Thereafter, when the substance is charged it obtains a final sintered shape, a so called matrix, which is not dissolved in the normal absorption of sorbate in the operation of the heat pump.

For the use of a liquid substance the advantage of a high power is obtained since the substance can be sprayed over the heat exchanger in both the charging and the discharging processes and hence be efficiently cooled and heated, respectively. The disadvantage associated with a solid substance is that the cooling capacity decreases as a function of the dilution of the absorbent. Actually, it limits strongly the operating interval within which the substance can be used, this in turn reducing the storage capacity, taken as above as cooling energy per litre substance. Most of the liquid substances for use in chemical heat pumps are solutions of strongly hygroscopic inorganic salts in preferably water and similarly water is used as the absorbent. This gives another limitation due the fact that the dissolved substance cannot be allowed to crystallize. Crystallization creates problems in spray nozzles and pumps.

By using a so called hybrid substance several of the advantages associated with solid and liquid systems can be combined, see the International patent application WO 00/37864 cited above. The chemical heat pump disclosed in this patent application operates according to a special procedure that can be called the hybrid principle, the hybrid method or the hybrid process. In that process, the substance exists both in a solid and a liquid state during the process, the solid phase being used for storing energy, with as large an energy density as in solid systems whereas the heat exchange to and from the substance is only made in the liquid phase of the substance with as large an efficiency as in common liquid systems. Only the liquid phase is used for heat exchange to the surroundings. A condition thereof is that the solid and liquid phases can be kept separated during the process. A separation can be obtained by filtering using a separating means of a suitable kind, such as a net or a filter or in some other way. The liquid phase, often called the "solution", is pumped and sprayed over a heat exchanger. As in the case of systems using only a solution, i.e. with a substance that all time is liquid, it is important that the pumps, valves and spray nozzles of hybrid systems are not blocked by crystals in the circulation path.

Thus generally, the solid system has in this regard an apparent advantage since it does not require any pumps, valves and spray nozzles.

In FIG. 1a a chemical heat pump is generally shown in a schematic way, the heat pump designed for producing cooling or heat and working according to the hybrid process described in the cited International patent application WO 00/37864. The heat pump includes a first container 1 or accumulator including a more or less dissolved substance 2 that can exothermically absorb or endothermically desorb a sorbate. The first container 1 is connected to a second container 3, also called condenser/evaporator, through a pipe 4. The second container 3 works as a condenser for condensing gaseous sorbate 6 to form liquid sorbate 5 during endothermic desorption of the substance 2 in the first container 1 and as an evaporator of liquid sorbate 5 to form gaseous sorbate 6 during exothermal absorption of the sorbate in the substance 2 in the first container 1. The substance 2 in the accumulator 1 is in heat conducting contact with a first heat exchanger 7 located therein which can in turn through a liquid flow 8 be supplied with heat from or deliver heat to the surroundings. The liquid 5 in the evaporator/condenser part 3 is similarly in a heat conducting contact with a second heat exchanger 9 located therein to or from which heat can be supplied or delivered from or to the surroundings, respectively, through a heat flow 10. In order that the heat pump will work according to the hybrid principle the first heat exchanger 7 together with the substance 2 in the solid state thereof is enclosed in a fine-meshed net or filter 11. Solution that is the liquid state of the substance exists in the lower portion of the accumulator 1 and is there collected in a free space 12 located beneath the first heat exchanger 7. From this space solution can through a conduit 13 and a pump 14 be sprayed over the first heat exchanger 7.

To sum up, the following is true:

In a system working with a solid substance a constant cooling temperature is obtained since the reaction occurs between two phase states of the substance. Both of these two phase states are solid and maintain, in a transformation from one of the states to the other state, a constant reaction pressure of the absorbent. The reaction pressure remains constant until all of the substance has been transformed from the first state to the second state. The disadvantage of the system is the very low heat conductivity and the low power resulting therefrom. Its advantages include that it works without any moving parts, has a high storage capacity and a constant reaction pressure.

In a system working with a hybrid substance the first phase is, when the absorbent is absorbed by the substance, i.e. in the discharge process, solid whereas the second phase is liquid and then in the same way as above, a constant reaction pressure of the absorbent is maintained. The substance will then successively continuously change from a solid to a liquid state at the same time as a constant cooling temperature is obtained. The process continues with a constant reaction pressure until all of the substance has changed from its solid to its liquid state. In the same way the reaction pressure is constant in the charging process when the substance changes from a liquid to a solid state. The storage capacity and the reaction pressure are equivalent to those for a solid substance. The method used in systems working with a hybrid substance in order to obtain a high power is to work with solutions in the same way as in a system working with a liquid substance. Liquid is pumped from the substance container through a system for separating crystals to a spraying system by which the solution is sprinkled over the heat exchanger that forms a separate unit in the reactor.

A heat pump driven by solar energy is disclosed in U.S. Pat. No. 4,231,772, in which a chamber working as an accumulator is connected to or itself works as a solar energy collector.

SUMMARY OF THE INVENTION

It is an object of the invention to provide a chemical heat pump for efficient cooperation with a solar energy collector.

Thus, in a chemical heat pump the accumulator unit or reactor unit is integrated with a solar energy collector, so that the heating of the active substance in an efficient way is obtained from solar radiation, which hits the solar energy collector. The reactor thus includes a vessel or a container, which is delimited by different walls or sides, and at least part of such a wall or side is arranged as a solar energy collector.

Furthermore, the chemical heat pump works according to the hybrid principle and has a particularly efficient design.

As has been mentioned above, chemical heat pumps working with a solid substance has the disadvantage associated with a very low heat conductivity and hence a low power or efficiency and the advantages of having the ability of working without any moving parts, a high storage capacity and a constant reaction pressure. Chemical heat pumps working with a hybrid substance has the advantages of a high power or efficiency due to the higher heat conductivity and additionally, the fact that they can also work without any moving parts and that they have a high storage capacity and a constant reaction pressure.

In a chemical heat pump working with a hybrid substance, if the solution of the active substance is used to increase the heat conduction between the active substance and the heat exchanger in the accumulator, which can for example be achieved by the fact that the active substance is not submitted to any displacement during the total process in the chemical heat pump, i.e. so that the active substance all the time is stationary or located in a stationary way, a chemical heat pump having a so called "solid" hybrid substance can be obtained. To achieve it, the solution of the active substance can be sucked into and/or be bonded in a passive substance, here called a matrix or a carrier, that generally should be in a good heat conducting contact with the heat exchanger in the accumulator and can be arranged as of one or more bodies which in turn can be closely integrated with each other. That the substance is passive means that it does not cooperate in the absorption and releasing of the volatile medium by the active substance. Thus, the function of the matrix is to maintain the solution of the active substance at the location thereof and thereby increase the heat conduction between the heat exchanger and the active substance when the active substance is changing from its liquid to its solid state in the charging process and from its solid to its liquid state during the discharging process. Thereby the fact that the solution often has a higher heat conducting capability than the solid substance can be exploited. The matrix is formed from a substance that is inert to the process in the heat pump and may generally have an ability of binding the solution phase of the active substance to itself and in same time allow the active substance to interact with the volatile medium. In particular, it may be desirable that the body or the bodies from which the matrix is formed should be efficiently capable of absorbing and/or be capable of binding the solution phase of the active substance in a capillary way. The matrix may include more or less separate particles, such as powders of for example varying granular sizes and comprising grains of varying shapes, fibres having for example varying diameters and varying fibre lengths, and/or a sintered mass having a suitable porosity, that for example does not have to be uniform but can vary within the formed matrix bodies. The size and shape of the particles, i.e. in the special cases grain size, diameter and porosity, and porosity in the case of a solid matrix and the choice of material in the matrix bodies influence in the respective case the storing capacity and power and efficiency of the finished accumulator. In the case where the matrix is applied as a layer to the surface of the heat exchanger, also the thickness of the layer can influence the power or efficiency of the accumulator.

The ability of the matrix to suck liquid into it so that the liquid forms the heat carrying medium and the ability thereof of still allowing gas transport through the matrix are equally applicable to the condenser/evaporator unit in a chemical heat pump. When charging the chemical heat pump, gas is being transported through the matrix to be condensed at the surface of the heat exchanger and then be absorbed by the matrix, after which the absorbed liquid increases the heat conduction of the matrix, so that more gas can be cooled, condensed and absorbed. When discharging the chemical heat pump the matrix releases water vapour, this cooling the absorbed volatile liquid that due to the its good heat conductivity transports heat for evaporation from the surface of the heat exchanger through the liquid to the evaporation zone.

Thus, the processes in the heat pump can be said to be performed with the active substance sucked into a body or wick of fibres or powder which has turned out to result in a high power or efficiency. The power or efficiency has little to do with heat conduction in the body or wick but depends on the reaction in the liquid phase, i.e. among other things the fact that the active substance in its finely divided state changes to a solution that conducts heat better than the finely divided solid material.

The matrix that may be said to be a sucking or absorbing material can be chosen among a plurality of different materials. For example, successful tests have been performed using fabrics of silicon dioxide as a matrix and a matrix including sand and glass powders in different fractions. The heat pump works by the fact that heat is conducted in the liquid phase at the same time as the structure of the matrix is sufficiently permeable to allow transport of the vapour phase of the volatile medium. It is also possible to produce the matrix by sintering a powder or fibres to form a more solid structure.

A chemical heat pump, also called an absorption machine, including a matrix as described above at least in the reactor, which is built together with a thermal solar energy collector, can at least in certain cases provide particular advantages. Such a heat pump can for example be built to have an efficient and simple exchange of heat with a medium from a heat sink such as the ambient air.

A chemical heat pump including a matrix can be implemented in a very robust and resistant way, so that it can endure the hard environment, in which a thermal solar energy collector is usually working.

As the thermal energy collector is integrated in the absorption machine, it is not necessary to move the input of solar energy radiation from a relatively large area to a smaller region, since the absorption machine can be implemented so that its reactor part or the reactor parts of a set of absorption machines is/are distributed over the entire large area. By those means cost gains can be achieved.

By integrating the thermal solar energy collector with the absorption machine, the consumption of material for manufacturing the solar energy collector and the absorption machine can be reduced and thus in certain cases the cost of a system including a solar energy collector and an absorption machine can even be halved.

Thus, the outer covering of the absorption machine can be design to include one or more of following features:
1. The surface of the outer covering is made energy receiving such as in a thermal solar energy collector.
2. The surface of the outer covering can be used as an air cooler in a heat sink.
3. The outer covering forms at the same time the outer vacuum protection as well as a heat exchanger for the enclosed matrix structure.

Furthermore, a chemical heat pump comprising a matrix can be produced at a relatively low cost for example as closed smaller units, which are combined to form a battery for heat exchange with outer media.

Generally, a chemical heat pump can be included in a solar energy cooling/solar energy heating system, which mainly includes four parts: absorption machine, solar energy collector, heat sink and a distribution system, i.e. various pipes for heat carrying media, typically water, and pumps.

By building the solar energy collector and the absorption machine together all components contained in the absorption machine can also be used in the solar energy collector without disturbing or impairing the function of any included part. Neither at building together, all parts of the distribution system are needed. Thus, the cost of the system can be significantly reduced.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1a is a schematic of a chemical heat pump according to prior art working according to the hybrid principle, FIG. 2a is a schematic similar to FIG. 1a but of a chemical heat pump in which the active substance is absorbed in a carrier, FIG. 2b is a schematic similar to FIG. 2a of an alternative embodiment of a chemical heat pump.

FIG. 7a is a schematic of a unit tube or unit cell that has a function similar to that of the chemical heat pump of FIG. 2a but having a different structure and exterior heat exchanger surfaces, FIG. 7b is a schematic similar to FIG. 7a but of a unit tube having a function similar to that of the chemical heat pump of FIG. 2b.

FIGS. 9a and 9b are end views of a tubular chemical heat pump including inner and outer heat exchangers, FIG. 9c is a side view of the chemical heat pump according to FIGS. 9a and 9b, and FIGS. 10a and 10b are views similar to FIGS. 8c and 8d but for another design of the box for forming a built-in heat sink.

DETAILED DESCRIPTION

Figure 1B:
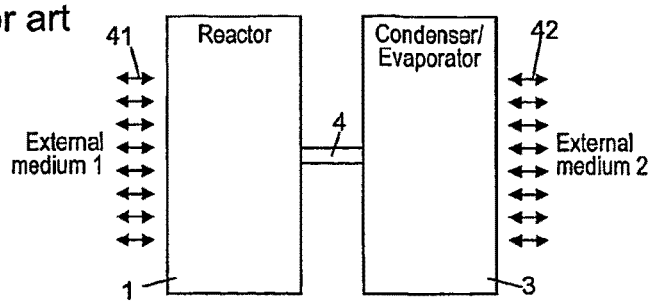
FIGS. 1b-1d are schematics illustrating generally the principle of a chemical heat pump.

A chemical heat pump, here also called absorption machine, can be built together with a solar energy collector in various ways. In the chemical heat pump schematically illustrated in FIG. 1b two containers are provided. A reactor 1 contains an active substance, which can exothermically absorb and endothermically desorb a gaseous sorbate. The reactor 1 is connected to a condenser/evaporator 3 through a pipe or a channel 4. The second container 3 works as a condenser for condensing gaseous sorbate to form liquid sorbate and as an evaporator of liquid sorbate to form gaseous sorbate. The substance in accumulator 1 is in heat exchanging contact with an external medium, which is symbolically indicated by the arrows 41, for the supply or removal of heat. The liquid in the evaporator/condenser 3 is likewise in heat exchanging contact with a second external medium, which is symbolically indicated by the arrows 42, to or from which heat can be supplied and removed.

Figure 1C:
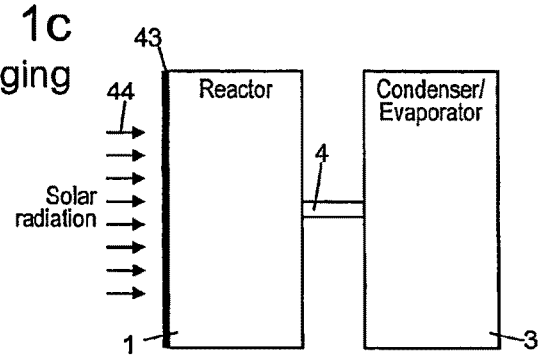
Figure 1D:
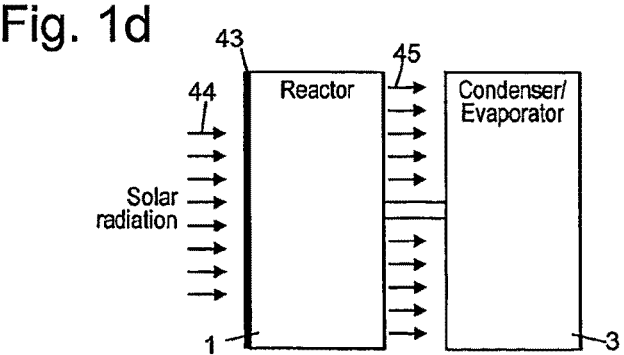

For the supply of heat a solar energy collector 43 can here be used, see FIG. 1c. Preferably a side or a surface of the reactor container 1 can serve as a solar energy collector for the supply of heat, see the arrows 44. Heat removal can be executed using inner or outer heat exchange as through another side or surface of the reactor vessel and for example the surrounding or ambient air, see the arrows 45 in FIG. 1d, or through an inner coil of a heat exchanger, compare FIG. 1a, or an outer coil of a heat exchanger.

According to the hybrid principle the active substance changes between a solid and a liquid state. To have the chemical heat pump work according to the hybrid principle the active substance has always to remain in the reactor 1. One way of achieving this is to limit the mobility of the substance in its solid form using a net 11 as is shown in FIG. 1a. Another way will be described below. For a chemical heat pump that works with an active substance, which all the time is in a solid state, this is not a problem.

With reference to FIG. 2a a modified chemical heat pump will now be generally described, which can be suitable to be integrated with the solar energy collector according to the discussion above. The modified chemical heat pump utilizes the hybrid process using a matrix for holding and/or carrying the active substance and it also utilizes a matrix for holding and/or binding the condensate, usually water.

The modified chemical heat pump includes in a conventional way a first container 1, also called accumulator or reactor, containing an active substance 2, herein also called only "substance". The substance can exothermically absorb and endothermically desorb a sorbate, also called the absorbent, the liquid form of which is often called "volatile liquid" herein and which can usually be water. The terms "volatile liquid" and "water" are herein used to denote the liquid form of the sorbate, so that is to be understood that even if only water is mentioned, other liquids can be used. The substance 2 is here illustrated to be held by or carried by or sucked into a matrix or carrier 13 that generally forms or is at least one porous body which has open pores and is made from a suitable inert substance. The matrix can in a typical case consist of a finely divided powder of for example aluminium oxide, applied in a layer having a suitable thickness, for example a relatively thin layer such as a layer having a thickness of 5-10 mm. In this embodiment the matrix in the first container 2 is applied only at the interior surfaces of this container that are located at a first heat exchanger 7, as shown particularly only at the vertical interior surfaces of the first container. The first container 1 is connected to another container 3, also called condenser/evaporator, through a fixed or stationary gas connection 4 having the shape of a pipe that at its ends is connected to the top sides of the containers 1, 3. The second container works as a condenser for condensing gaseous sorbate 6 to form liquid sorbate 5 in an endothermic desorption of the substance 2 in the first container 1 and as an evaporator of liquid sorbate 5 to form gaseous sorbate 6 in an exothermic absorption of sorbate in the substance in the first container. The second container 3 is here illustrated to have half the portion of its interior surface, which is in contact with a second heat exchanger 9, covered with a material 14 that is sucking in a capillary way and half the same interior surface is free. In the embodiment according to the figure it means that half the inner vertical surface of the second container 3 is covered with a material having a capillary sucking function whereas the rest of the interior surface thereof is free. Condensation of gaseous sorbate 6 occurs at the free surface of the heat exchanger 9 in the second container 3, and evaporation occurs from the material 14 that is capillary sucking on the interior surface of the second container.

The various components of the chemical heat pump, also called the system, i.e. the interior spaces in the first and second containers 1, 3 and the gas conduit 4 that are in fluid connection with each other, are entirely gas tight and evacuated from all other gases than the gas 6 participating in the chemical process, also called the volatile medium or absorbent, that usually is water vapour. The active substance 2 in the accumulator 1 is in a direct heat conducting contact with surfaces of the first heat exchanger 7 that in this embodiment is located at the vertical interior surfaces enclosing the accumulator 1, and that thus also can be said to enclose the accumulator, and that can be supplied with heat from or deliver heat to the surroundings through a first liquid flow 8. The liquid 5 in the evaporator/condenser part 3 is in a similar way in a direct heat conducting contact with surfaces of the second heat exchanger 9 that in this embodiment is placed at the vertical interior surfaces of the evaporator/condenser part and hence also can be said to enclose the evaporator/condenser part and to and from which heat can be supplied or transported from or to the surroundings, respectively, through a second liquid flow 11.

The active substance 2 in the chemical heat pump is selected so that it at the temperatures for which the heat pump is intended can operate so that it changes between a solid and a liquid state in the discharging and charging processes of the heat pump. Thus, the reaction in the accumulator 1 occurs between two phases, a solid phase state and a liquid phase state, of the active substance. In the discharging process when the absorbent is absorbed by the substance the first phase is solid whereas the second phase is liquid and then a constant reaction pressure is maintained for the absorbent. The substance will then successively change from a solid to a liquid state at the same time as a constant cooling temperature is obtained. The process continues with a constant reaction pressure until substantially all of the active substance has changed from its solid to its liquid state. In a corresponding way the reaction pressure in the charging process is constant while the substance is changing from its liquid to its solid state.

A normal hybrid substance, see the patent application WO 00/37864 mentioned above, can advantageously be used that is diluted to a desired concentration in the solution of the sorbate and thereafter is sucked into a matrix consisting of an inert powder, i.e. a powder of a material that is not to any substantial extent changed during the operation of the chemical heat pump. Thus, the material should have a solid state during the changing conditions in the heat pump and it should not chemically interact with, i.e. not chemically influence or be affected by, any of the substances or media that change their aggregate states during operation of the heat pump. In tests performed this powder has for example been aluminium oxide and the active substance LiCl. Other possible active substances may be $SrBr_2$, etc., see also the International patent application WO 00/37864 mentioned above. The granular size of the powder can here be of importance and also the capability thereof to suck or absorb in a capillary way. To form suitable bodies of the matrix such a powder can first be applied to one or more surfaces of a heat exchanger as a layer having a suitable thickness, for example with a thickness between 5 and 10 mm. In most cases then a net-structure of some kind, not shown, must be applied to the heat exchanger to hold the respective layer in order to form a body from the powder. For example, tests have been performed using layers, having a thickness of 10 mm applied to the outside of pipes, inside pipes and to the bottom of the container. The solution, i.e. the active substance diluted by the volatile medium, also called the sorbate, in its liquid state, is then sucked into the powder in the layers and is allowed to run out of it, until all of the remaining solution is bonded in a capillary way in the powder in the layers. Thereafter, the reactor can be used in the same way as a reactor for a solid substance is used, see e.g. the International patent application WO 00/31206 mentioned above.

The matrix together with the substance held therein is in this case not a solid body but a loose mass similar to wet sand in the discharged state of the heat pump. However, in the charged state of the heat pump the matrix is hard. The solution of the active substance has a significantly better heat conducting capability than the substance in the solid state thereof. Heat from the first heat exchanger 7 can then be efficiently transported to or away from the active substance. If for example a matrix consisting of aluminium oxide is filled with a 3 molar LiCl solution, a very rapid and efficient charging of the system is performed down to about a 1 molar solution. Thereafter the power decreases since the active substance now does not any longer contain any solution, i.e. does not exist in any part in a liquid phase or a solution phase. However, there is no problem to drive the process down to the concentration of 0 molar. In the discharging process the process works very well up to a state where the solution is 2.7 a 2.8 molar after which it is retarded. This is so because the matrix has not any longer any permeability to gas when the concentration of 3 molar is reached. In this condition the matrix is full, i.e. the matrix has absorbed as much solution as is substantially possible.

The function and power of hybrid systems using a solution sucked into a matrix is typically significantly better than those of solid systems. However, larger heat exchanger surfaces are required than required for systems using hybrid substances and only a free solution. Tests show that a 2 á 3 times larger heat exchanger area is required to reach, in a hybrid system using a "bonded" solution phase, the same power as in a hybrid system using only a free solution. However, then the power density at the surface in such a system having an increased efficient area of the heat exchanger surface is so small that the heat exchanger does not necessarily have to be directly acting but can advantageously be enlarged. The term directly acting heat exchanger or a directly acting heat exchange between heat exchanger and active substance/solution means that the substance/solution exists at the outer surface of a smooth, simple wall of the heat exchanger while the heat carrying/cooling medium or the fluid in the heat exchanger is circulating at the interior surface of the same wall. i.e. the substance/solution has a substantially direct contact with the heat exchanger medium, through only a relatively thin and flat wall in the heat exchanger. The term heat exchanger or a heat exchange with en enlarged surface means that the substance/fluid exists at a surface of the heat exchanger that has been given an enlarged effective heat exchanging area by for example being corrugated and/or provided with protruding portions of some suitable kind, such as flanges. For a hybrid system using a solution sucked into a matrix it means that also the matrix is located at such a surface of the heat exchanger.

Figure 3:
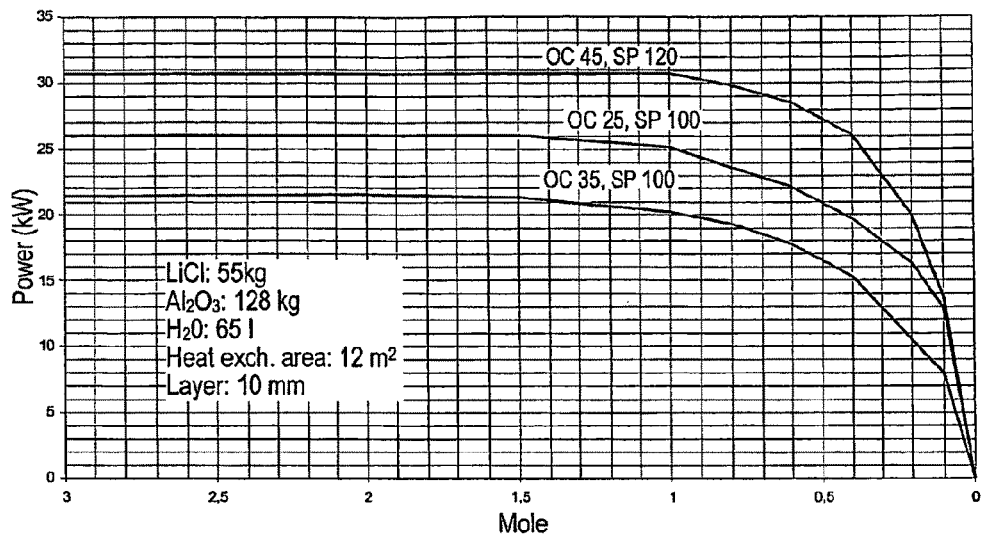
FIG. 3 is a diagram of the charging process in a chemical heat pump according to FIG. 2 using LiCl as the active substance.
Figure 4:
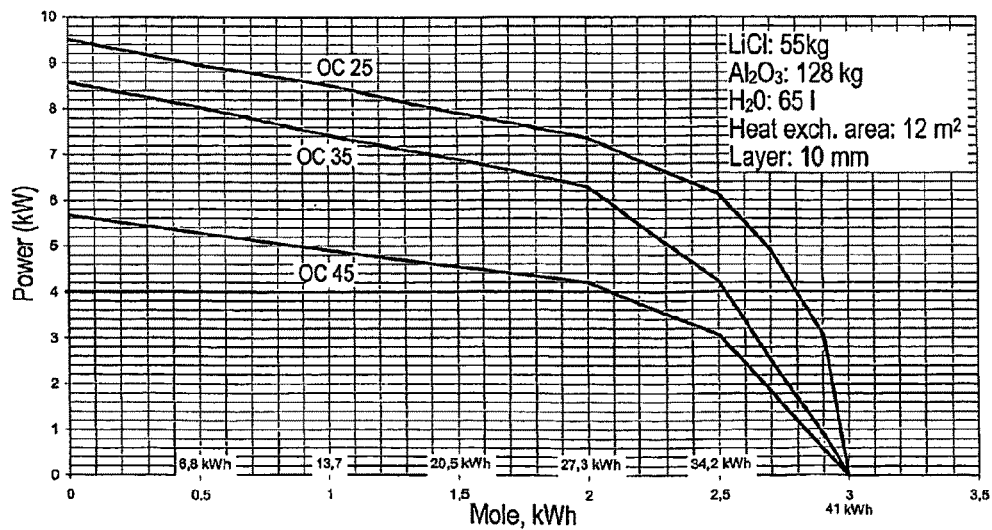
FIG. 4 is a diagram similar to FIG. 3 but of the discharging process.
Figure 5:
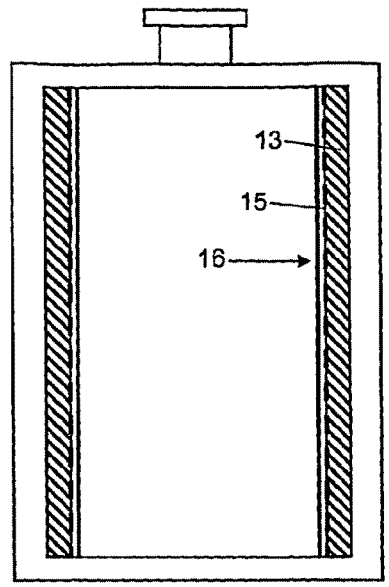
FIG. 5 is a schematic of an accumulator tank for the chemical heat pump shown in FIG. 2, FIGS. 6a, 6b and 6c are cross-sectional detail views of a matrix material placed at a heat exchanger surface.

Tests that have been performed at a laboratory scale and then have been recalculated for a full scale have provided data for charging and discharging, respectively, that appear from the diagrams of FIGS. 3 and 4. These tests have been performed using accumulators 1 having the shape of circular cylindrical vessels of 1 litre of the diameter 100 mm and height 130 mm, in which a layer 13 having a thickness of 10 mm of an inert material with a substance contained therein is located at the cylindrical interior surface of the vessel, i.e. at the interior side of its envelope surface. The matrix material and the substance are in this embodiment held at their places by a net structure including a net 15 having an exterior covering of a more fine meshed structure such as a cotton cloth 16 or a fine meshed net, see FIG. 5. Any changes of the structure or function of the layer including an inert carrier and the substance have not been observed during the tests performed.

Figure 6D:
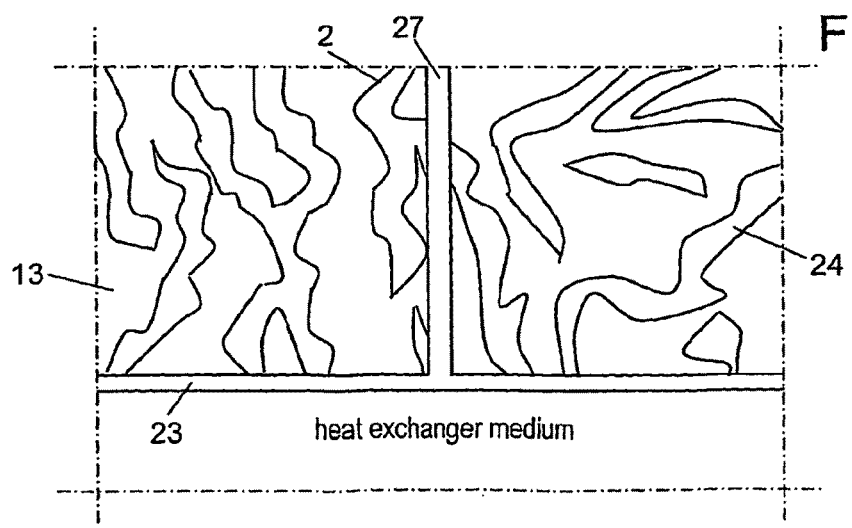
FIG. 6d is a cross sectional detail view of a matrix material located at a heat exchanger surface from which a flange projects.
Figure 6A:
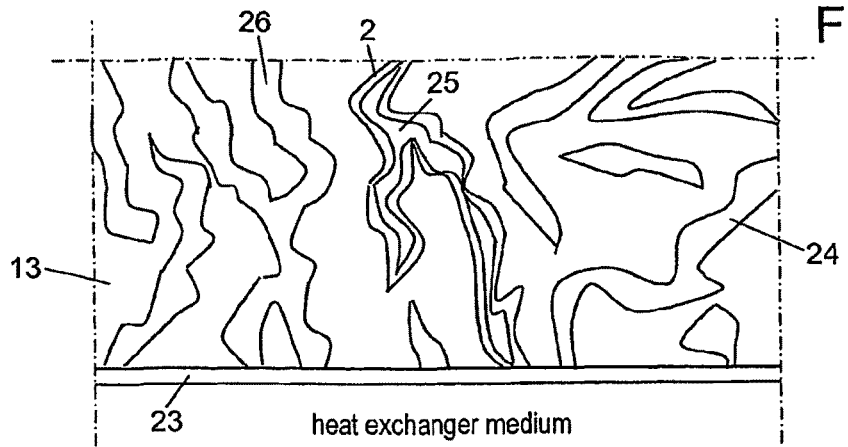
Figure 6B:
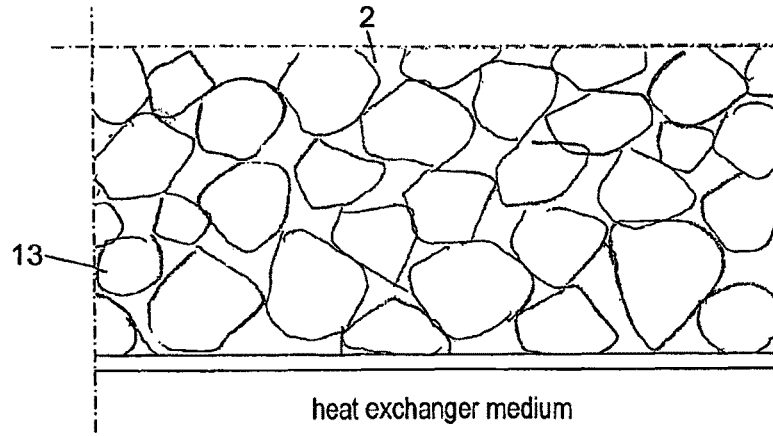
Figure 6C:
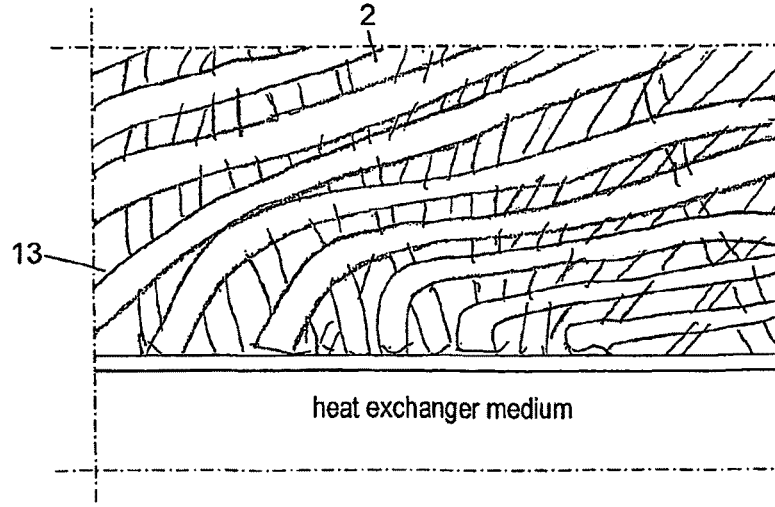
Figure 8A:
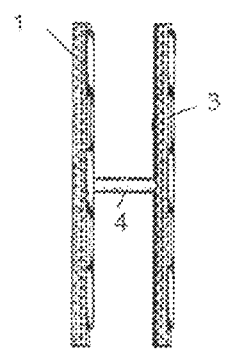
FIGS. 8a and 8b are a side view and a perspective view, respectively, of a chemical heat pump.
Figure 8B:
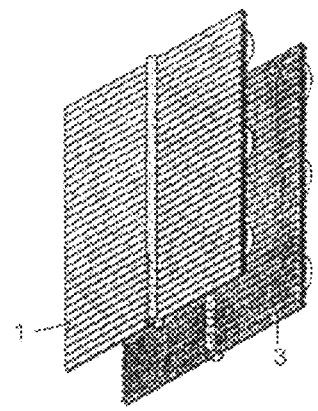
Figure 8C:
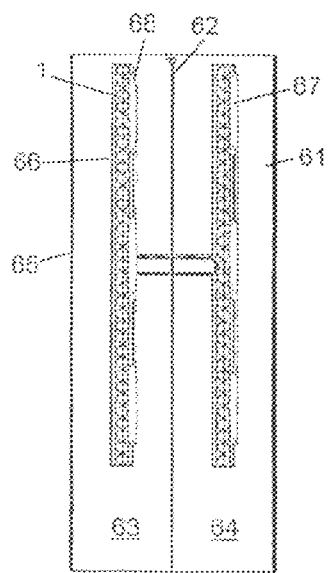
FIGS. 8c and 8d are views similar to FIGS. 8a and 8b, but the chemical heat pump is built into a specially designed box.
Figure 8D:
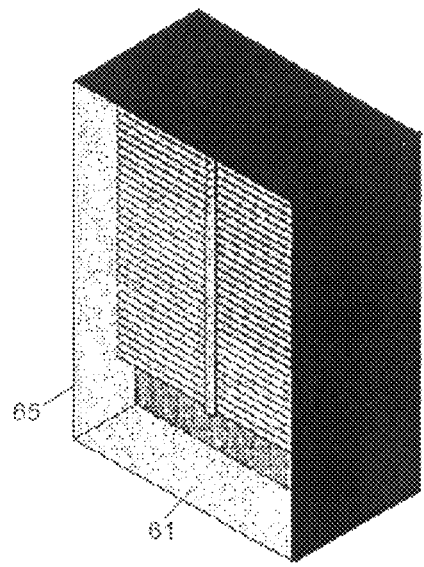

The general structure of the matrix is schematically shown in FIG. 6a. The layer or the body 13 of a porous matrix material is applied to one side of a heat exchanger wall 23 and has pores 24. The pores have generally such a cross section that they allow transport and absorption of the gaseous sorbate. The matrix can carry active substance 2 on the walls in the pores that can interact with gaseous sorbate in the remaining channels 25 that can exist in some stages of the operation of the heat pump. The pores can also be completely filled as shown at 26 with solution or with condensate, respectively. The matrix material is chosen so that it at its surface can bind active substance/solution/condensate and hence it can suitably be hydrophilic or at least have a hydrophilic surface, if water is used as the fluid in the system. However, it is possible to use materials which have no hydrophilic surface or generally no surface that is wet by the active substance in the solution phase thereof or at which the active substance in its solution phase is not significantly bonded, provided that the active substance is introduced into the matrix, such as by mixing or stirring it together with it, before it is applied at the heat exchanger walls, even if a chemical heat pump having such a matrix often works satisfactorily only during a few cycles of the operation of the heat pump. The size of the pores can be selected for example so that they are capillary sucking for the liquid phase that they are to absorb which can be particularly suitable for a matrix placed in the condenser/evaporator. Typical cross-sectional dimensions of the pores 24 can be in the range of 10-60 µm. It may be disadvantageous to have too narrow pores since they can make the interaction of the volatile medium with all parts of the active substance more difficult. The volume of the pores can be for example at least 20% and preferably at least 40%, even at least 50% of the bulk volume of the matrix body. The matrix can as has been mentioned above alternatively be of a sintered or equivalent material, i.e. form a substantially solid, connected body. The matrix can also be formed from particles of different shapes, such as more or less spherical particles, see FIG. 6b, or from elongated particles, for example from fibre pieces that can be relatively short having a length/thickness ratio in e.g. the range of 1:2 to 1:10, see FIG. 6c. The heat exchanger wall 23 can be provided with flanges 27 as shown in FIG. 6d.

EXAMPLE 1 OF MATRIX MATERIAL

A material suitable as a matrix material is produced from a powder of $Al_2O_3$. The density of the powder grains is 2.8 kg/cm$^3$ and their diameter is 2-4 µm. The powder is applied in layers with a solution of active substance contained therein according to the description above and the dry matrix material in the layers has a bulk density of about 0.46 kg/cm$^3$ which gives an average filling rate or degree of the finished matrix material of 0.45, i.e. almost half the volume is taken by the powder grains. The channels between the powder grains in the produced layers have a diameter of the magnitude of order of 60 µm.

EXAMPLE 2 OF MATRIX MATERIAL

A material suitable as a matrix material is produced by moulding a mixture of 1 (weight) part of Portland cement and 5 (weight) parts of powder of $Al_2O_3$ as in Example 1. This material can approximately be considered as "sintered".

EXAMPLE 3 OF MATRIX MATERIAL

A fibre material suitable as a matrix material is produced from fibres which consist of 54% $SiO_2$ and 47% $Al_2O_3$ and have a melting point of about 1700° C. The density of the fibres is 2.56 kg/cm$^3$ and the diameters thereof are 2-4 µm. The fibres are compressed in a wet state to increase their packing density. The bulk density after drying the compressed material is about 0.46 kg/cm$^3$ which gives an average filling ratio of 0.17 of the finished matrix material. The channels between the fibres in the compressed material have diameters of between about 5 and 10 µm.

In the embodiment described above the matrix layer 13 is applied in the simplest possible way, such as to a substantially smooth interior surface of a heat exchanger.

In another embodiment unit tubes 29 are provided in which the reactor 1 and the condenser 3 are located inside the same closed tube. The reactor part 1 then has its matrix 2 located around the bottom portion of the interior surface of the walls, see FIG. 7a. The top portion of the tube that forms the condenser/evaporator part 3 is separated by a diaphragm 30 from which the gas channel 31 in an interior tube 32 passes to the topmost portion 33 of the tube from which vapour then can be condensed and collected in the space 34 between the gas channel and the upper wall surfaces in the unit tube and be evaporated from this space. Such unit tubes can be manufactured totally hermetically from glass or enameled steel.

The unit tube 29 can also have matrix substance 14 placed in its condenser/evaporator part 3 and it can then be placed at the top portion of the interior surface of the tube, inside the space 34, so that a channel 38 is formed between the exterior surface of the tube 32 and the interior surface of the matrix for allowing condensate and vapour to pass to all portions of the matrix, see FIG. 7b.

It is also possible that all fluid, i.e. typically all the water, in the condenser can be sucked in a capillary way and thereby be completely eliminated as a free liquid in the chemical heat pump, see the installation in FIG. 2b. Here all the interior surfaces of the evaporator/condenser 3 except the top interior surface have been provided with a matrix material that is capillary sucking. Heat exchanging medium must then also be circulating at the bottom of this container. Such a configuration without any free liquid can for example be achieved with the unit tubes or unit cells described above and an additional example will be described below.

Now more detailed examples of a chemical heat pump built together with a solar energy collector will be described.

Solar Energy Collector Built Together with an Absorption Machine of Flat Type (SADp)

As illustrated in FIGS. 8a-8d an absorption machine including a reactor 1, a condenser/evaporator 3 and a gas channel 4 is built together with a solar energy collector placed in a box or a casing 61. The box has an inner separating wall 62, which divides the inside of the box into a front space 63, in which the reactor is placed, and a rear space 64, in which the condenser/evaporator 3 is placed. The gas channel 4 extends through the separating wall. Both the reactor 1 and the condenser/evaporator 3 can be designed to have a flat shape or plate-shape similar to that of panels, so that they have a relatively small thickness in relation to their lateral extent. The gas channel 4 may be connected to for example the middle of the panel-shaped parts.

Furthermore, the box 61 has on its front a wall or a plate 65 that is transparent to sun light, so that sun radiation can penetrate into the front space. The sun can then in the daytime illuminate, through the transparent wall, the surface 66 of the absorption machine which is facing said wall and which is made up of the parts of the wall of the reactor 1 which are directed forwards. This surface, i.e. said parts of the walls that are directed forwards, can then be a part of the vacuum tight outer wall of the reactor and may for example be made from a metal or a ceramic material. Said surface 66 is also designed as a thermal solar energy collector having solar energy collecting properties, in which is included the property typical of thermal solar energy collectors to be capable of receiving solar energy and at the same time not or at least not in any significant degree radiating thermal energy, this being conventionally achieved by having an optically selective layer applied to the surface thereof. Other heat losses can to some extent be avoided by applying some heat insulation to the other walls of the box 61.

The function in the charging process is as follows.

The reactor part 1 of the absorption machine can in the daytime be heated. This occurs by solar radiation passing the transparent wall 65 and then hitting the surface/wall parts 66. This surface is constructed so that it converts the incoming solar radiation into heat, which is conducted by the material in the surface/wall pails into the interior of the reactor and there brings about the vaporization of the sorbate bound by the active substance, producing for example water vapour. The water vapour travels through the channel 4 to the evaporator/condenser 3 of the absorption machine, in which the water vapour is condensed and can in the case where a matrix is used be bonded as water in the matrix. This charging process continues as long as the active substance has a temperature that is sufficiently high compared to the temperature of the condensed sorbate. The condensate is cooled by heat exchange with a heat sink and can for example be held at a temperature approximately 40° C. lower relative to the active substance. By normal daily incoming solar radiation the active substance will then be completely converted to a solid state and the machine is fully charged.

The function in the discharging process is as follows.

After the sun has finished illuminating the absorption machine through the wall 65, the delivery of heating or cooling, if desired, can be carried out. If heating is desired it is achieved by the fact that water is circulating in the pipe coil 67 at the evaporator/condenser 3, the water being connected to a heat sink, not shown, of a suitable temperature, bringing the condensate to a temperature for example corresponding to the current temperature of the ambient air. Condensed sorbate will then be vaporized and pass to the active substance in reactor 1 to be absorbed therein. The active substance with the sorbate contained therein can then become about 40° C. warmer than the condensate. If it for example is maintained at a temperature of +5° C., the temperature of the hygroscopic salt matrix, i.e. the active substance with contained sorbate, can become about 45° C. If pipe coils are for example applied to the rear side of the reactor 1, they can be coupled to an existing waterborne heating system, not shown. The water in these pipe coils is then being pumped to the pipes of the waterborne heating system.

Instead, if cooling is desired, the pipe coils 67 at the evaporator/condenser 3 are connected to a waterborne cooling system, not shown, for the transport of cold to the place where it is wanted. At the same time, pipe coils 68 at the reactor 1 are connected to a heat sink, not shown, maintaining the reactor for example at the current temperature of the ambient air. The pipe coils 67, 68 can be arranged at the rear side of corresponding parts. Then, if the active substance is maintained at a temperature of for example 45° C., water from the pipe coils 67 having a temperature of approximately C can be delivered to the waterborne cooling system.

Solar Energy Collector Built Together with an Absorption Machine (SaDr) of Tubular Type In this embodiment a unit tube or a unit cell is used of a type similar to the unit tube according to FIG. 7b but having another design.

An absorption machine which is built together with a solar energy collector includes a vacuum tight space formed between an exterior glass tube 71 and an interior glass tube 72, which are concentrically arranged, see FIGS. 9a and 9b. The different parts, the reactor, the evaporator/condenser and the connecting gas channel of the absorption machine are arranged in this vacuum tight space.

An aluminium plate 73 is applied to the surface of the interior glass tube 72, which is directed towards the common axis, the aluminium plate forming an aluminium flange heat exchanger and also passing around and being in good heat conducting contact with axially extending parts of an interior copper pipe coil 74. The copper pipe coil and the bent aluminium plate together form an interior heat exchanger.

In the same way an aluminium plate 75 extends around the major part of or the main body of the exterior glass tube 71. Thus, the aluminium plate can have the shape of a cylinder from which a strip-shaped area parallel to the cylinder axis has been removed. Furthermore, the aluminium plate 75 is in good heat conducting contact with axially extending parts of an exterior copper pipe coil 76. The copper pipe coil and the bent aluminium plate together form an exterior heat exchanger. The exterior aluminium plate can have axially extending, relatively broad, strip-shaped areas 77 that are suitable for attaching the entire absorption machine. The free surface of the exterior heat exchanger is built as a solar energy collecting surface having the typical property of thermal solar energy collectors of being capable of receiving solar energy and at the same time not in any mentionable degree radiating heat energy, where it can be achieved using a so called optically selective layer, not shown, which is applied to the surface.

In the case where the absorption machine is of hybrid type comprising a matrix in both the reactor and the evaporator/condenser a particular implementation can be obtained, which can be advantageous at least in certain cases. The matrix of the absorption machine for holding the condensate, i.e. usually water, is formed to a layer 78 on the wall surface of the inner glass tube 72 directed outwards, so that this layer has a tubular shape. The matrix 79 for holding/carrying the active substance, i.e. typically the hygroscopic salt, is formed as a layer on the inside of the outer glass tube 71 and thus also has a tubular shape. Thus, both matrices have the shape of relatively thick tubes, which are suitably concentric with the glass tubes and the cylindrical walls of the inner and outer aluminium plates. Between the matrices there is a room or intermediate space 80, which serves as the gas channel (4) described above and also has the shape of a relatively thick tube.

It is obvious that the glass tubes together with the matrices and the active substance and the sorbate arranged therein can be used together with heat exchangers of other types than those shown in the drawings. Thus, they can be used for example without any own solar energy collecting surface or without being in direct contact with a solar energy collector.

Several such absorption machines of tubular type can be placed close to one another in the form of a battery, not shown, to form for example a flat assembly.

The function in the charging process is as follows.

The absorption machine including a vacuum tight space limited by concentric glass tubes with an exterior heat exchanger having properties favourable to receiving thermal solar energy is placed so that a surface of the exterior heat exchanger is in daytime illuminated by the sun.

The result is that the exterior heat exchanger 75, 76 and the outer glass tube 71 are heated by the solar radiation, so that the outer matrix 79 with the hygroscopic salt contained therein starts to release water vapour, which in turn travels a short distance through the intermediate space at 80 to the inner matrix 78, where the vapour is condensed and bonded as water in said matrix. This charging process continues as long as the outer matrix and the hygroscopic salt in the matrix have a temperature high enough due to the exposure to sun radiation and the inner matrix at the same time, by cooling from a heat sink, not shown, is being maintained a temperature lower than that of the hygroscopic salt, for example at a temperature approximately 40° C. lower. This cooling is achieved by the fact that water connected to the heat sink is being pumped through the inner copper pipe coil 74, the cold water cooling the flanges 81 of the inner aluminium plate, which extends around the inner copper pipe and which in turn cools the inner matrix 78 containing the condensate.

The function in the discharging process is as follows.

After the sun has stopped illuminating the absorption machine, delivery of heat or cooling, if desired, can take place. If heat is desired, it is executed by the fact that water in the inner coil of copper pipes 74 is circulating, the water being connected to a heat sink, not shown, and then the temperature of the matrix 78 containing the condensate will be maintained at for example the current temperature of the ambient air. Then the hygroscopic salt in the outer matrix 79 becomes for example about 40° C. warmer than the inner matrix, the temperature of which is for example is held at +5° C. The hygroscopic salt will then assume a temperature of 45° C. and the outer coil of copper pipes 76 is connected to an existing waterborne heating system, not shown, pumping water in this coil into the pipes of the heating system.

Instead, if cooling is desired, the inner copper pipe coil 74 of the absorption machine is connected to a waterborne cooling system, not shown, where cooling is delivered. At the same time the outer coil of copper pipes 76 is connected to a heat sink, not shown, in such a way that the outer matrix 79 and the salt contained therein is maintained at for example the current temperature of the ambient air. If this heat sink keeps the temperature of the hygroscopic salt at for example 45° C., water from the inner matrix 78 containing water can, through of the inner copper pipe coil 76, be delivered at a temperature of approximately 5° C. to the waterborne cooling system.

Solar Energy Collector Built Together with an Absorption Machine and a Heat Sink (SADV)

An absorption machine built together with a solar energy collector can be constructed and placed in a box 61 in the same way as the absorption machine according to FIGS. 8a-8d. Here, the box is open at its top and bottom sides, i.e. generally at two opposite sides, which are connected by the separating wall 62. The box has also been provided with a flap 91, see FIGS. 10a-10b, which is articulated at an edge of the separating wall at the first of the open sides. The flap can be opened forwards and backwards, permitting the ambient air to cool either the surfaces of the reactor 1 or the surfaces of evaporator/condenser 3, allowing air to be freely flowing from the second of the open sides and over respective surfaces by setting the flap so that a free passage is allowed through the front and rear space 63, 64, respectively, in the box 61.

Thus, a heat sink is obtained from the ambient air, flowing over respective surfaces.

The function in the charging process is as follows.

The reactor part 1 of the absorption machine can be heated at daytime. It occurs by solar radiation passing through the transparent wall 65 and then hitting the surface/wall parts 66. This surface is of such a nature, that it converts the incoming solar radiation into heat, which is conducted by the material in the surface/wall parts into the interior of the reactor and brings about that the sorbate bonded to the active substance is vaporized, producing for example water vapour. The water vapour is transferred through the channel 4 to the evaporator/condenser 3 of the absorption machine, the water vapour is condensed therein and can in the case where a matrix is used be bonded as water in said matrix. This charging process continues as long as the active substance has a temperature that is sufficiently high compared to the temperature of the condensed sorbate. The condensate is cooled by heat exchange with a heat sink and can for example be maintained at a temperature about 40° C. lower relative to the temperature of the active substance. In this machine that is built together with a heat sink it is achieved by holding the flap 91 open, so that relatively cold ambient air can be freely flowing over the evaporator/condenser 3 and cool it and in the special case the matrix containing water. For normal daily incoming solar radiation the active substance will then be completely transformed into its solid state and the machine is then fully charged.

The function in the discharging process is as follows.

In this machine, which is built together with a heat sink, it takes place by holding the flap 91 open, so that air can be freely flowing over the evaporator/condenser 3, cooling it and in the special case the matrix containing water, not shown in these figures.

After the sun has finished illuminating the absorption machine through the wall 65, delivery of heating or cooling can, if desired, take place. If heating is desired, it is achieved by the fact that water is circulating in the pipe coil 67 at the evaporator/condenser 3, the water being connected to a heat sink of an adequate temperature, so that the condensate assumes for example a temperature corresponding to the current temperature of the ambient air. In this machine, which is built together with a heat sink, it is done by holding the flap 91 open, so that air can be freely flowing over the evaporator/condenser 3, cooling it and in the special case the matrix containing water. Condensed sorbate, i.e. typically water, will then be evaporated and pass to the active substance in the reactor 1 to be absorbed therein. The active substance together with the sorbate contained therein can then become for example about 40° C. warmer than the condensate. If the latter for example is maintained at a temperature of +5" C, the temperature of the hygroscopic salt matrix, i.e. the active substance together with the sorbate contained therein, can become approximately 45° C. If pipe coils 68 are arranged at for example the rear side of reactor 1, they can be connected to an existing waterborne heating system, not shown. Then, the water in these coils of pipes is being pumped to the pipes of the waterborne heating system.

Instead, if cooling is desired, pipe coils 67 at the evaporator/condenser 3 are connected to a waterborne cooling system, not shown, for conveying cooling to the locations where it is desired. At the same time the pipe coils 68 at the reactor 1 are connected to the heat sink, maintaining the temperature of reactor 1 at for example the current temperature of the ambient air. In this machine, which is built together with a heat sink, it can be achieved by holding the flap 91 open, so that relatively cold air can be freely flowing over the reactor, cooling the hygroscopic salt and in the special case its holding matrix. If then the active substance is held at a temperature of for example 45° C. water at a temperature of approximately 4° C. from the pipe coils 67 can be delivered to the waterborne cooling system.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A chemical heat pump including an active substance and a volatile liquid that can be absorbed by the substance at a first temperature and be desorbed by the substance at a second higher temperature, including:
    a reactor part containing the active substance and arranged to be heated and cooled by an external medium,
    an evaporator/condenser part containing the portion of the volatile liquid that exists in a condensed state, and arranged to be heated and cooled by an external medium, and
    a channel for the vapour phase of the volatile liquid, the channel connecting the reactor part and the evaporator/condenser part to each other,
    characterized in that the reactor part includes
    a vessel or a container having an area of a side wall arranged as a solar energy collector or having an area of a side wall in direct contact with a solar energy collector, and
    a matrix for the active substance, said matrix being in contact with said side wall,
    the active substance and the volatile liquid being selected, so that the active substance at the first temperature is in a solid state from which the active substance when absorbing volatile liquid in the vapour phase thereof at least partly changes to a liquid state or a solution phase, and the active substance at the second temperature is in a liquid state or exists in a solution phase, from which the active substance when releasing the volatile liquid, in particular the vapour phase thereof, changes at least partly to a solid state, and wherein the active substance is held in the matrix at all times whether the active substance is in a solid state, a liquid state, or a solution phase, wherein the matrix comprises open pores, and cross-sectional dimensions of the pores are in a range of 10-60 um.

2. A chemical heat pump according to claim 1, characterized in that the chemical heat pump is arranged in a box with a separating wall for circulating the ambient air either around the reactor part or the evaporator/condenser part.

3. A chemical heat pump according to claim 2, characterized in that the box is open at two opposite sides, which are connected by the separating wall, the box being provided with a flap, which is articulated at a free edge of the separating wall and which can be opened forwards and backwards, allowing ambient air to cool surfaces of the reactor part or surfaces of the evaporator/condenser part.

4. A chemical heat pump according to claim 2, characterized in that the box has a front including a wall or a board transparent to solar radiation, so that solar radiation can penetrate into a front space towards a surface of the reactor part.

5. A chemical heat pump according to claim 1 characterized in that said side surface is a part of a cylindrical exterior wall of the reactor part, the reactor part enclosing the evaporator/condenser part.

6. A chemical heat pump according to claim 5, characterized by an exterior heat exchanger, including an aluminum plate bent around the cylindrical exterior wall, which is in direct contact with the cylindrical exterior wall, at least a part of the exterior heat exchanger arranged as a solar energy collecting surface.

7. A chemical heat pump according to claim 1, characterized in that the evaporator/condenser part at at least a portion of a surface includes a porous material, that is permeable to the volatile liquid, the matrix and the permeable material being arranged as concentric layers with a space existing therebetween, which forms the channel.

8. A chemical heat pump according to claim 1 characterized in that the matrix is of an inert material.

9. A chemical heat pump according to claim 8, characterized in that the inert material includes aluminum oxide.

10. A chemical heat pump according to claim 1 characterized in that the matrix is made from a material comprising pores which are permeable to the volatile liquid and in which the active substance is applied.

11. A chemical heat pump according to claim 1 characterized in that the matrix is made from a material having a surface to which the active substance in the liquid state can be bonded.

12. A chemical heat pump according to claim 11, characterized in that the material has a surface that is wet by the active substance in the liquid state thereof and/or the volatile liquid in the liquid state thereof.

13. A chemical heat pump according to claim 1 characterized in that the matrix is made from a material comprising separate particles.

14. A chemical heat pump according to claim 13, characterized in that the material comprising separate particles is a powder or a compressed fibre material.

15. A chemical heat pump according to claim 1 characterized in that the matrix together with the active substance held therein is enclosed in a restricting structure.

16. A chemical heat pump according to claim 15, characterized in that the restricting structure includes a net device comprising at least a net or a cloth of a fibre material.

17. A chemical heat pump according to claim 1 characterized in that the evaporator/condenser part at at least a portion of the surface of a heat exchanger includes a porous material that is permeable to the volatile liquid.

18. A chemical heat pump according to claim 17, characterized in that the porous material that is permeable to the volatile liquid in the liquid and/or gas state thereof is of an inert material.

19. A chemical heat pump according to claim 18, characterized in that the inert material [[in]] includes aluminum oxide.

20. A chemical heat pump according to claim 17, characterized in that the porous material that is permeable to the volatile liquid in the liquid and/or gas state thereof is made from a material comprising pores which are permeable to the volatile liquid in the liquid and/or gas state thereof.

21. A chemical heat pump according to claim 17, characterized in that the material has a surface to which the active substance in the liquid state can be bonded.

22. A chemical heat pump according to claim 21, characterized in that the material has a surface that is wet by the active substance in the liquid state thereof and/or the volatile liquid in the liquid state thereof.

23. A chemical heat pump according to claim 17, characterized in that the porous material that is permeable to the volatile liquid in the liquid and/or gas state thereof is made from a material comprising separate particles.

24. A chemical heat pump according to claim 23, characterized in that the material comprising separate particles is a powder or a compressed fibre material.

25. A chemical heat pump according to claim 17, characterized in that the porous material that is permeable to the volatile liquid in the liquid and/or gas state thereof has the shape of a layer of material applied to a surface.

26. A chemical heat pump according to claim 17, characterized in that the porous material that is permeable to the volatile liquid in the liquid and/or gas state thereof is enclosed in a restricting structure.

27. A chemical heat pump according to claim 26, characterized in that the restricting structure includes a net device comprising at least a net or a cloth of a fibre material.

28. A chemical heat pump including an active substance and a volatile liquid that can be absorbed by the substance at a first temperature and desorbed by the substance at a second higher temperature, the active substance having at the first temperature a solid state from which the active substance when absorbing volatile liquid and the vapour phase thereof immediately or directly partly changes partially to a liquid state or a solution phase and at the second temperature has a liquid state or exists in a solution phase, from which the active substance when releasing, the volatile liquid, in particular the vapour phase thereof, directly changes partly to a solid state, including:

a reactor part containing, the active substance and arranged to be heated and cooled by an external medium, an evaporator/condenser part containing the portion of the volatile liquid that exists in a condensed state, and arranged to be heated and cooled by an external medium, and a channel for the vapour phase of the volatile liquid, the channel connecting the reactor part and the evaporator/condenser part to each other, characterized in wherein the reactor part includes a matrix for the active substance and the active substance is held in the matrix at all times whether the active substance is in a solid state, a liquid state, or a solution phase, wherein the matrix comprises open pores, and cross-sectional dimensions of the pores are in a range of 10-60 um and in the evaporator/condenser part at at least at one portion of the surface of a heat exchanger includes a porous material, that is permeable to the volatile liquid, the matrix and the permeable material being arranged as concentric layers with a space existing therebetween, which forms the channel.

29. A chemical heat pump according to claim 28, characterized by an outer glass tube and an inner glass tube, which are concentrically arranged and between which a vacuum tight space exists, in which the matrix and the permeable material are applied.

30. A chemical heat pump according to claim 29, characterized in that the matrix is arranged as a layer directly inside the outer glass tube.

31. A chemical heat pump according to claim 29, characterized in that the permeable material is arranged radially as a layer radially directly outside the inner glass tube.

32. A chemical heat pump according to claim 29, characterized by an exterior heat exchanger arranged in direct contact with the outside of the outer glass tube, in particular a heat exchanger including a pipe conduit and/or a flange heat exchanger.

33. A chemical heat pump according to claim 29, characterized by an interior heat exchanger arranged in direct contact with the radially inner side of the inner glass tube, in particular a heat exchanger including a pipe conduit and/or a flange heat exchanger.

* * * * *

UNITED STATES PATENT AND TRADEMARK OFFICE
CERTIFICATE OF CORRECTION

PATENT NO. : 8,839,642 B2  
APPLICATION NO. : 12/672430  
DATED : September 23, 2014  
INVENTOR(S) : Göran Bolin and Ray Olsson Page 1 of 1

It is certified that error appears in the above-identified patent and that said Letters Patent is hereby corrected as shown below:

On the Title Page

Item 75, "Inventors," please delete "Goran Bolin" and insert:

-- Göran Bolin --

Signed and Sealed this  
Tenth Day of March, 2015

Michelle K. Lee  
*Deputy Director of the United States Patent and Trademark Office*